(12) United States Patent
Tsai et al.

(10) Patent No.: US 8,395,869 B2
(45) Date of Patent: Mar. 12, 2013

(54) ESD PROTECTION CIRCUIT WITH EOS IMMUNITY

(75) Inventors: Fu-Yi Tsai, Hsinchu (TW); Po-Chun Hsieh, Kaohsiung (TW); Wen-Ching Hsiung, Hsinchu (TW)

(73) Assignee: Faraday Technology Corp., Science-Based Industrial Park, Hsin-Chu (TW)

( * ) Notice: Subject to any disclaimer, the term of this patent is extended or adjusted under 35 U.S.C. 154(b) by 260 days.

(21) Appl. No.: 12/974,480

(22) Filed: Dec. 21, 2010

(65) Prior Publication Data

US 2012/0154960 A1  Jun. 21, 2012

(51) Int. Cl.
*H02H 9/00* (2006.01)
*H01C 7/12* (2006.01)
*H02H 1/00* (2006.01)
*H02H 1/04* (2006.01)
*H02H 3/22* (2006.01)

(52) U.S. Cl. .................................. 361/56; 361/118

(58) Field of Classification Search .................... 361/56
See application file for complete search history.

(56) References Cited

U.S. PATENT DOCUMENTS

| | | | | |
|---|---|---|---|---|
| 6,144,542 A * | 11/2000 | Ker et al. | ...................... | 361/111 |
| 6,867,461 B1 | 3/2005 | Ker et al. | | |
| 7,907,373 B2 * | 3/2011 | Jeon | .............................. | 361/56 |
| 2011/0026176 A1 * | 2/2011 | Kim | ................................ | 361/56 |
| 2012/0069478 A1 * | 3/2012 | Caplan et al. | .................... | 361/56 |

* cited by examiner

*Primary Examiner* — Dharti Patel
(74) *Attorney, Agent, or Firm* — Winston Hsu; Scott Margo

(57) ABSTRACT

ESD protection circuit with EOS immunity is provided, which includes a first connection circuit, a first EOS control circuit formed by at least a diode, and an ESD clamp respectively coupled between a pad, a first clamp node, an I/O clamp node and a second source node. When the ESD clamp detects ESD through the I/O clamp node, it is triggered to conduct from the I/O clamp node to the second source node. When the pad receives EOS, the first EOS control circuit provides a cross voltage between the first clamp node and the I/O clamp node, such that a voltage of the I/O clamp node becomes less than a characteristic voltage of the ESD clamp to prevent the ESD clamp from reverse conducting.

17 Claims, 7 Drawing Sheets

ESD PROTECTION CIRCUIT WITH EOS IMMUNITY

BACKGROUND

1. Technical Field

The present invention relates to an ESD (Electro-Static Discharge) protection circuit with EOS (Electric Over-Stress) immunity, more particularly, to an ESD protection circuit immune to erroneous triggering of EOS to achieve both ESD protection and EOS immunity.

2. Description of the Related Art

Dice, chips and integrated circuits have become the most important hardware bases of modern information society. A chip is equipped with I/O interface to exchange information with other circuits (e.g., circuit boards and/or other chips); however, as the I/O interface directly contacts electronic environment external to the chip through conductive structures like pads, pins and/or solder balls, abnormal electronic events conduct to the chip through the I/O interface to cause malfunctions and/or damages.

BRIEF SUMMARY

Therefore, the invention provides ESD protection circuits with EOS immunity for I/O interfaces of chips (dice and integrated circuits), so the internal circuits of the chips can be protected from impacts of external abnormal electronic events such as ESD and EOS.

Among possible abnormal electronic events occurred in chip I/O interfaces, ESD (Electro-Static Discharge) happens when accumulated electro-static charges are suddenly conducted to conductive structures of the I/O interfaces (e.g., pads/pins/solder balls). ESD can be modeled as a charge source which can build a rapid high voltage pulse (with a duration of one to several nanoseconds) on conductive structures by accumulated electro-static charges; however, if its charges can be quickly routed outside the chips as current, the charge source dissipates, and its impact of high voltage is minimized or prevented. Therefore, an ESD protection circuit is used to provide a current path routing current/charges of ESD while ESD is detected.

In addition to aforementioned ESD, another kind of abnormal electronic events known as EOS (Electrical Over-Stress) draws much attention in recent years. Generally speaking, EOS occurs when conductive structures of chips are erroneously connected to impropriate voltages; for example, conductive structures of chips can be erroneously short to exceeding voltages during chip assembly (e.g., fixing, installing and/or soldering chips to circuit boards) and/or testing. Comparing to rapid high voltage due to charge accumulation of ESD, EOS can be modeled as a voltage source sustaining longer (in an order of over one microsecond, or even longer than one to several seconds); if the ESD protection circuit in a chip conducts a current path during EOS, exceeding current will sustain to flow through the current path and then jeopardize the ESD protection circuit. To address the issue, the invention provides an ESD protection circuits with EOS immunity which not only provides a current path dissipating charges during ESD, but also greatly increases equivalent resistance of the current path during EOS, so the ESD protection circuit and the internal circuit of the chip can be kept immune to damages of exceeding voltage and current owing to EOS.

An object of the invention is providing an ESD protection circuit, for an I/O interface (I/O circuit) of a chip. The ESD protection circuit comprising a first connection circuit coupled between a pad and a first clamp node; a first EOS control circuit coupled between the first clamp node and an I/O clamp node; and an ESD clamp coupled between the I/O clamp node and a second power node; the ESD clamp working in a triggered conduction mode and a reverse conduction mode; wherein when the ESD clamp detects ESD, the ESD clamp works in the triggered conduction mode conducting the I/O clamp node to the second power node; when a voltage of the I/O clamp node is greater than a first characteristic voltage, the ESD clamp works in the reverse conduction mode conducting the I/O clamp node to the second power node; wherein when the pad receives EOS, the first EOS control circuit provides a first cross voltage between the first clamp node and the I/O clamp node such that the voltage of the I/O clamp node is less than the first characteristic voltage.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

As previously discussed, pads receive EOS due to improper handling during manufacturing, assembly and testing. In contrast with charge source essence of ESD, EOS presents a nature of exceeding (positive or negative) voltage sustaining long duration. Therefore, conventional ESD protection would be damaged by exceeding current due to sustaining high voltage of EOS.

Figure 1:
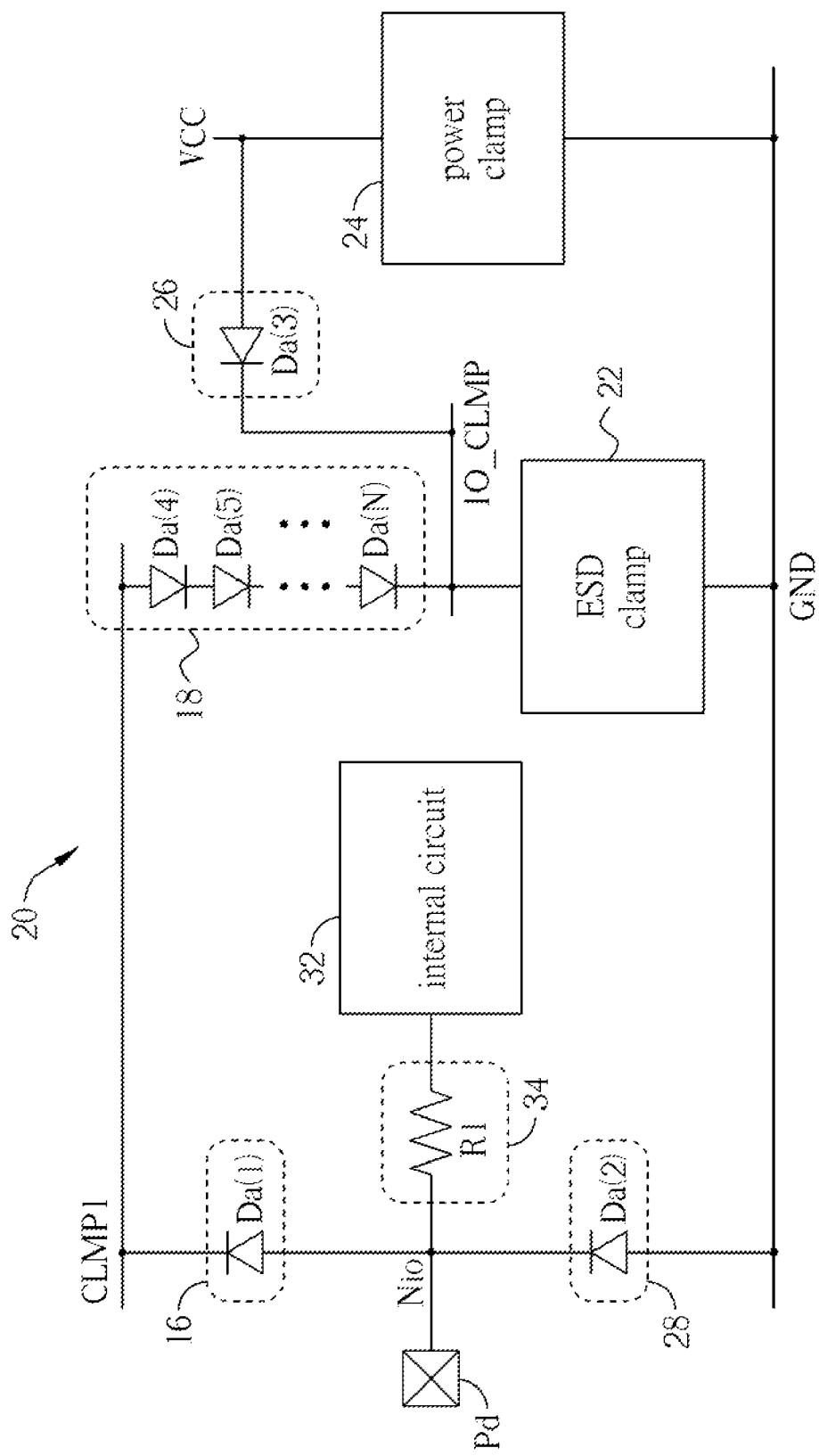
FIG. 1 to FIG. 3 respectively illustrate ESD protection circuits according to different embodiments of the invention.

A novel ESD protection circuit with EOS immunity is therefore considered. Please refer to FIG. 1 illustrating an ESD protection circuit 20 according to one embodiment of the invention. The ESD protection circuit 20 can be implemented in an I/O interface of a chip (a die, a integrated circuit); through a pad Pd, an internal circuit 32 of the chip exchanges data (e.g., transmits and/or receives data) with external circuits (not shown). The ESD protection circuit 20 of the invention has connection circuits 16, 28 and 26 (as a first, a second and a third connection circuits respectively), an EOS control circuit 18 (as a first EOS control circuit) and an ESD clamp 22 in association with a power clamp 24 and a current limiter 34. The pad Pd is coupled to the internal circuit 32 through a node Nio and the current limiter 34.

The ESD protection circuit 20 is coupled to operation voltages respectively through two power nodes VCC and GND (as first and second power nodes). The connection circuit 16 is coupled between the pad Pd (through the node Nio) and a node CLMP1 (as a first clamp node), the EOS control circuit 18 is coupled between the node CLMP1 and another node IO_CLMP (as an I/O clamp node), and the ESD clamp 22 is coupled between the node IO_CLMP and the power node GND. The node IO_CLMP is coupled to the power node VCC through the connection circuit 26, and the power clamp 24 is coupled between the power nodes VCC and GND. Another connection circuit 28 is coupled between the node Nio (the pad Pd) and the power node GND.

In the embodiment of FIG. 1, the connection circuit 16 is implemented with a diode Da(1) with its anode and cathode respectively coupled to the node Nio (the pad Pd) and the node CLMP1. The connection circuit 28 is implemented by another diode Da(2). The connection circuit 26 can be implemented by a diode Da(3). Implement of the EOS control circuit 18 is achieved by one or more serially connected diodes Da(4) to Da(N) (where N is a constant integer). The diodes Da(1), Da(2) and Da(3) can be the same or different, the diodes Da(4) to Da(N) can be the same or different, and each of the diodes Da(4) to Da(N) can be the same as or different from the diodes Da(1), Da(2) and Da(3). The current limiter 34 is implemented by a resistor R1. The power clamp 24 is used to clamp the voltage between the power nodes VCC and GND.

The ESD protection circuit 20 performs ESD protection as follows. When ESD occurs to present a positive voltage difference between the pad Pd and the power node GND, the connection circuit 16 forward conducts the pad Pd to the node CLMP1, the connection circuit 18 forward conducts the node CLMP1 to the node IO_CLMP, so the ESD event at the pad Pd is reflected to the node IO_CLMP. When the ESD clamp 22 detects ESD occurrence from the node IO_CLMP, it works in a triggered conduction mode to conduct the node IO_CLMP to the power node GND. In this way, a current path is conducted between the pad Pd and the power node GND to dissipate charges of ESD and to protect the internal circuit 32 from ESD damages. The resistance impedance provided by the current limiter 34 helps to prevent ESD current from flowing into the internal circuit 32.

On the other hand, if ESD occurs with a positive voltage difference between the power node GND and the pad Pd, the connection circuit 28 forward conducts a current path from the power node GND to the pad Pd for ESD protection.

Because ESD events accumulate exceedingly high voltage in a very short duration, the ESD clamp 22 is designed to be quickly triggered to conduct when a rapidly accumulated high voltage is detected. However, owing to circuitry nature of the ESD clamp 22, even when ESD detection does not reflect ESD occurrence, the ESD clamp 22 would work in a reverse conduction mode to conduct the node IO_CLMP to the power node GND if the voltage difference between the node IO_CLMP and the power node GND is greater than a first characteristic voltage, e.g., a breakdown voltage of the ESD clamp 22 which leads to a breakdown conduction between the node IO_CLMP and the power node GND. Such circuitry nature becomes a disadvantage for EOS immunity: as the ESD clamp 22 could be conducted by high voltage of EOS, it would be damaged by sustaining high current during EOS.

Nevertheless, according to the circuit architecture of the invention, when a positive EOS (as a positive voltage difference) occurs between the pad Pd and the power node GND, the EOS control circuit 18 provides a first cross voltage between the nodes CLMP1 and IO_CLMP to keep the voltage of the node IO_CLMP less than the first characteristic voltage, then the ESD clamp 22 will not conduct due to EOS. Or, equivalently, the ESD clamp 22 provides an exceeding equivalent resistance between the node IO_CLMP and the power node GND during EOS. Thus, EOS immunity is achieved as the ESD clamp 22 will not conduct exceeding current of EOS, and damages of ESD protection mechanism caused by EOS can be prevented.

Figure 2:
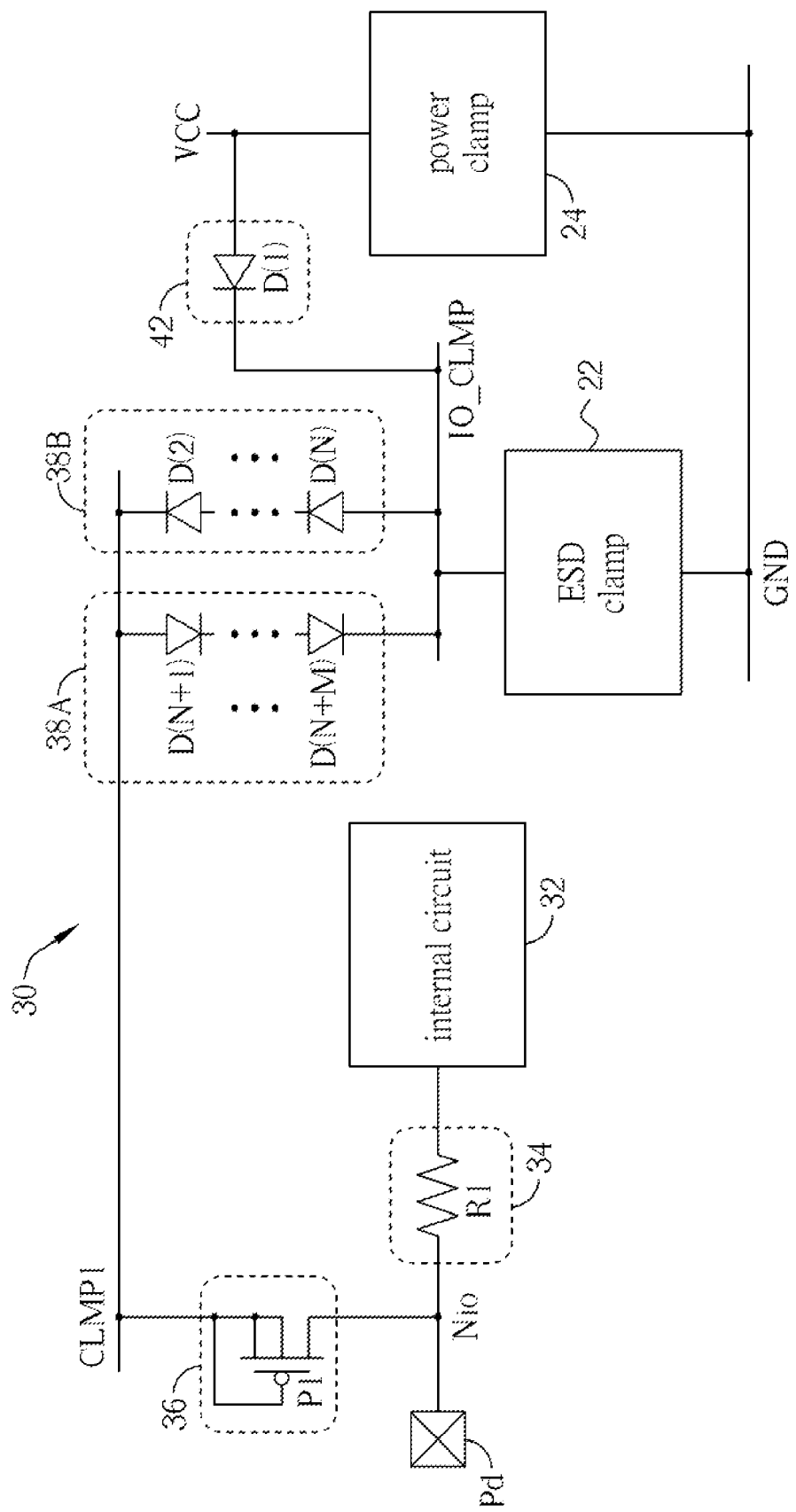

Please refer to FIG. 2 illustrating an ESD protection circuit 30 according to another embodiment of the invention. Similar to the embodiment of FIG. 1, the ESD protection circuit 30 of FIG. 2 includes a connection circuit 36 (as a first connection circuit) coupled between the nodes Nio (the pad Pd) and CLMP1, and the ESD clamp 22 coupled between the node IO_CLMP and the power node GND; also has the current limiter 34 between the pad Pd and the internal circuit 32 in association with a connection circuit 42 (a third connection circuit implemented by, e.g., a diode D(1)) between the node IO_CLMP and the power node VCC, as well as the power clamp 24 between the power nodes VCC and GND.

Different from FIG. 1, the ESD protection circuit 30 includes two EOS control circuits 38A and 38B between the nodes CLMP1 and IO_CLMP, with the connection circuit 28 between the node Nio and the power node GND omitted. In the embodiment of FIG. 2, the EOS control circuit 38A is implemented by one or more serially connected diodes D(N+1) to D(N+M) (where N and M are constant integers). The diode D(N+1) has an anode coupled to the node CLMP1, the diode D(N+M) has a cathode coupled to the node IO_CLMP, and each of the diodes D(N+1) to D(N+M−1) has a cathode respectively coupled to an anode of each of the diodes D(N+2) to D(N+M). The EOS control circuit 38B is implemented by one or more serially connected diodes D(2) to D(N); the diode D(N) has an anode coupled to the node IO_CLMP, the diode D(2) has a cathode coupled to the node CLMP1, and each of the diodes D(N) to D(3) has a cathode respectively coupled to an anode of each of the diodes D(N−1) to D(2). The diodes D(2) to D(N) can be different or matched, the diodes D(N+1) to D(N+M) can be different or the same, the diodes D(2) to D(N) and D(N+1) to D(N+M) can be different or the same.

In the embodiment of FIG. 2, the connection circuit 36 between the nodes Nio (the pad Pd) and CLMP1 is implemented by a p-channel MOS field effect transistor P1 with its gate, source and drain coupled to the node CLMP1 and its drain coupled to the pad Pd through the node Nio. The connection circuit 36 works in a forward conduction mode to conduct the pad Pd to the node CLMP1; when the positive voltage difference between the node CLMP1 and the pad Pd is greater than a second characteristic voltage, the connection circuit 36 also works in a reverse conduction mode to conduct the node CLMP1 to the pad Pd. For example, the second characteristic voltage can be a breakdown voltage of the transistor P1 leading to breakdown conduction of the transistor P1.

The ESD protection circuit 30 performs ESD protection as follows. When ESD occurs with a positive voltage difference between the pad Pd and the power node GND, the connection circuit 36 and the EOS control circuit 38A forward conduct the pad Pd to the node IO_CLMP through the node CLMP1, so the ESD event happened at the pad Pd is reflected to the node IO_CLMP. When the ESD clamp 22 detects ESD from the node IO_CLMP, it works in a triggered conduction mode to conduct the node IO_CLMP to the power node GND, thus a current path from the pad Pd to the power node GND is formed.

On the other hand, if ESD with a positive voltage difference between the power node GND and the pad Pd occurs, the ESD clamp 22, working like an equivalent diode with an anode coupled to the power node GND and a cathode coupled to the node IO_CLMP, forward conducts the power node GND to the node IO_CLMP, and the EOS control circuit 38B forward conducts to the node CLMP_1. As the diode-connected transistor P1 of the connection circuit 36 conducts the node CLMP_1 to the pad Pd by breakdown, a current path from the power node GND to the pad Pd forms for ESD protection. Because duration of ESD is very short, breakdown conduction of the transistor P1 will not damage it. As the p-channel MOS field effect transistor P1 is adopted, its parasite p-n-p bipolar junction transistor can be utilized to enhance ESD protection ability between the power node GND and the pad Pd.

The ESD protection circuit 30 implements EOS immunity as follows. When EOS occurs with a sustaining positive voltage difference between the pad Pd and the power node GND, the connection circuit 36 and the EOS control circuit 38A would forward conduct; if the ESD clamp 22 reverse conducts (works in the reverse conduction mode) due to exceeding voltage of the node IO_CLMP which reflects EOS at the pad Pd, the connection circuit 36, the EOS control circuit 38 and the ESD clamp 22 would form a current path conducting destructive exceeding current. However, according to the invention, the EOS control circuit 38A will provide a first cross voltage between the nodes CLMP1 and IO_CLMP which is greater enough to keep the voltage of the node IO_CLMP less than the first characteristic voltage of the ESD clamp 22, therefore the ESD clamp 22 can be effectively kept from conducting by EOS, and EOS immunity is achieved.

When a negative EOS occurs between the pad Pd and the power node GND occurs with a positive sustaining high voltage difference between the power node GND and the pad Pd, the ESD clamp 22 and the EOS control circuit 38B would forward conduct the power node GND to the node CLMP1; if the voltage difference between the node CLMP1 and the Pad Pd is greater than the second characteristic voltage of the connection circuit 36, the connection circuit 36 would reverse conduct (work in the reverse conduction mode) to complete a current path from the power node GND to the pad Pd. With proper circuit design and arrangement of the invention, however, the EOS control circuit 38B will provide a second cross voltage between the nodes IO_CLMP and CLMP1 during EOS; the second cross voltage is great enough to keep the voltage difference between the node CLMP1 and the pad Pd less than the second characteristic voltage and to prevent reverse conduction of the connection circuit 36. Thus, the ESD protection circuit 30 can avoid damages of exceeding current conducted by reverse conduction during negative EOS From the aforementioned discussion, it is understood that a systematic circuit design can be adopted to implement EOS immunity for the ESD protection circuit 30 according to the invention. For example, ESD protection requirements can be considered to design the ESD clamp 22 and the connection circuit 36. According to the design, the first characteristic voltage of the ESD clamp 22 and the second characteristic voltage of the connection circuit 36 are known. Referring to the first and second characteristic voltages, as well as requirements of EOS immunity, circuit configurations of the EOS control circuit 38A and 38B can be decided. For instance, assuming each of the diodes D(N+1) to D(N+M) in the connection circuit 38A provides a cross voltage Vpn between its anode and cathode, a highest voltage of positive EOS reaches a voltage OV+, and the first characteristic voltage is Vc1, then the ESD protection circuit 30 will have EOS immunity strong enough to prevent conduction of current path during positive EOS with the quantity M of the diodes D(N+1) to D(N+M) greater enough to fulfill M*Vpn>((OV+)−Vc1)

Similarly, assuming a maximum voltage magnitude of negative EOS is |OV−|, each of the diodes D(2) to D(N) in the connection circuit 38B provides a cross voltage Vpn between its anode and cathode, and the second characteristic voltage of the connection circuit 36 is Vc2, EOS immunity against forming of current path during negative EOS can be established with the quantity (N−1) greater enough to satisfy (N−1)*Vpn>(|OV−|−Vc2)

Figure 3:
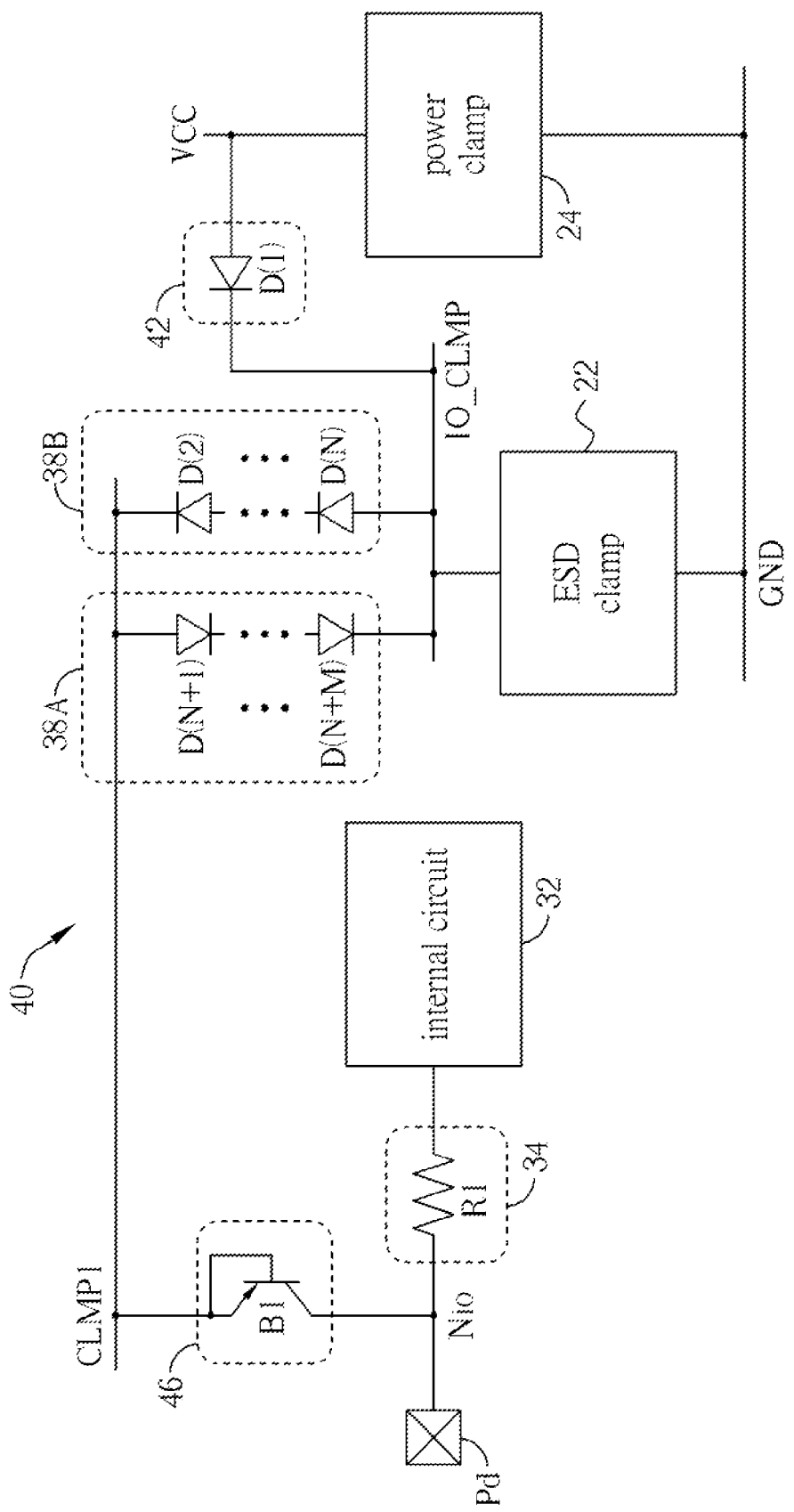

Following the embodiment of FIG. 2, please refer to FIG. 3 which illustrates an ESD protection circuit 40 according to another embodiment of the invention. Basically, circuit architecture and working principle of the ESD protection circuit 40 are similar to those of the ESD protection circuit 30 of FIG. 2; one of the main differences is that a p-n-p bipolar junction transistor B1 is used to implement a connection circuit 46 between the nodes CLMP1 and Nio (the pad Pd) in the ESD protection circuit 40. An emitter and a base of the transistor B1 are coupled to the node CLMP1, and a collector is coupled to the pad Pd. If the ESD protection circuit 40 is formed on a semiconductor structure with a thicker substrate which allows deeper doping wells or regions, vertical n-type wells can be adopted to form the p-n-p bipolar junction transistor B1 with a vertical structure. If vertical n-type wells are not available in the semiconductor structure of the ESD protection circuit 40, literal structure can be used to implement the transistor B1. In addition, the transistor B1 can be implemented by a field oxide device/transistor built on field oxide. Similar to operation of FIG. 2, the connection circuit 46 of FIG. 3 features a second characteristic voltage of reverse conduction; according to requirement of EOS immunity and the second characteristic voltage of the connection circuit 46, circuit architecture of the connection circuit 38B can be determined. Generally, the connection circuits 16, 36 and 46 of FIG. 1 to FIG. 3 can provide p-n junctions between the nodes Nio (the pad Pd) and CLMP1 with their second characteristic voltages being the breakdown voltages of the p-n junctions.

Figure 5:
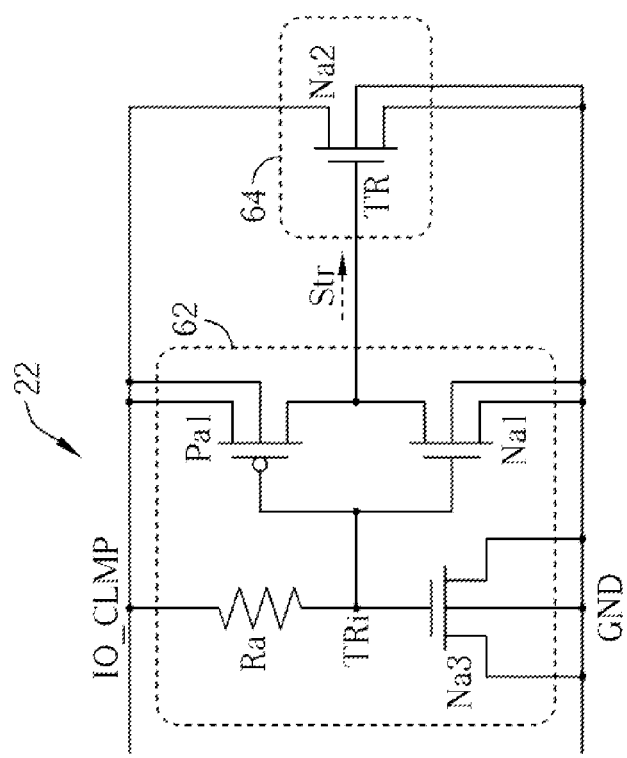
FIG. 4 and FIG. 5 respectively illustrate ESD clamps of FIG. 1 to FIG. 3 according to different embodiments of the invention.
Figure 4:
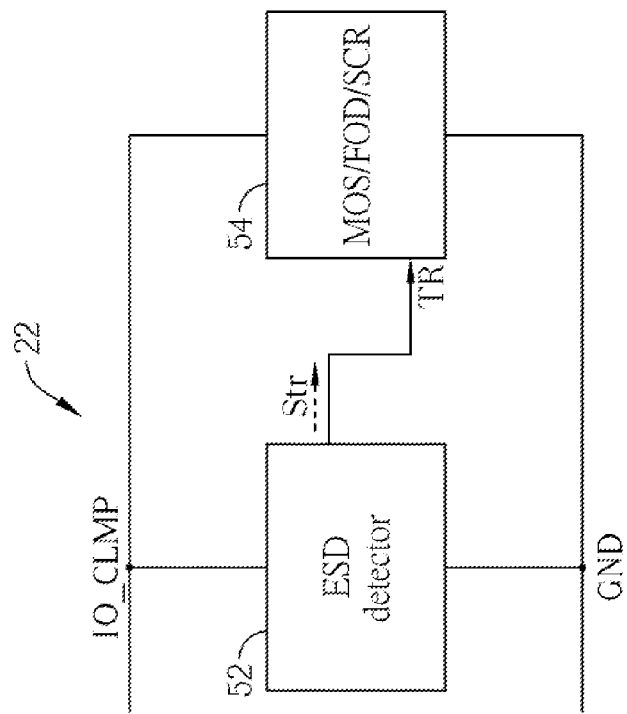

With the embodiments of FIG. 1 to FIG. 3, please refer to FIG. 4 and FIG. 5; the ESD clamp 22 can be implemented by embodiments shown in FIG. 4 or FIG. 5. In the embodiment of FIG. 4, the ESD clamp 22 includes an ESD detector 52 and a discharge circuit 54. The ESD detector 52, coupled between the node IO_CLMP and the power node GND, detects ESD occurrence and provides a trigger signal Str according to the ESD detection. The discharge circuit 54, also coupled to the node IO_CLMP and the power node GND, is coupled to the ESD detector 52 at a trigger node TR for receiving the trigger signal Str. When ESD occurs with a rapidly raising voltage at the node IO_CLMP, the ESD detector 52 reflects occurrence of ESD event in the ESD detection result, and turns on the discharge circuit 54 for conduction with the trigger signal Str; then the ESD clamp 22 is driven to work in the triggered conduction mode by the discharge circuit 54, so the node IO_CLMP is conducted to the power node GND to form a current path for dissipating ESD.

When the ESD detector 52 does not trigger the discharge circuit 54, the discharge circuit 54 can be equivalently approximated as a diode with an anode and a cathode respectively coupled to the power node GND and the node IO_CLMP. When the voltage of the power node GND is greater than that of the node IO_CLMP with enough voltage difference, the discharge circuit 54 forward conducts the power node GND to the node IO_CLMP. When the voltage of the node IO_CLMP is greater than that of the power node GND with a voltage difference greater than a characteristic voltage of the discharge circuit 54, the discharge circuit 54 reverse conducts the node IO_CLMP to the power node GND. Therefore, the characteristic voltage leading to reverse conduction of the discharge circuit 54 becomes the first characteristic voltage of the ESD clamp 22; for example, the characteristic voltage is a breakdown voltage leading to breakdown conduction of the discharge circuit 54.

In an embodiment of the invention, the discharge circuit 54 is implemented by a field oxide device (FOD, e.g., a field oxide transistor), a MOS field effect transistor or an SCR, and the ESD detector 52 can send the trigger signal Str by substrate triggering; i.e., the ESD detector 52 triggers the discharge circuit 54 by substrate triggering.

In the embodiment of FIG. 5, the ESD clamp 22 also includes an ESD detector 62 and a discharge circuit 64. The ESD detector 62 includes a p-channel MOS field effect transistor Pa1, two n-channel MOS field effect transistors Na1 and Na3, and a resistor Ra. The transistor Na3 connects and works as a capacitor coupled to the resistor Ra at a node TRi, thus an RC circuit is formed between the node IO_CLMP and the power node GND. The transistors Pa1 and Na1 form an inverter which inverts a signal of the node TRi to a trigger signal Str of a trigger node TR. The discharge circuit 64 can be implemented by an n-channel MOS field effect transistor Na2.

When ESD occurs to build a rapidly rising voltage at the node IO_CLMP, because the capacitor coupled to the node TRi can not be charged immediately, the voltage of the node TRi can not track that of the node IO_CLMP and becomes a relatively low voltage against the high voltage of the node IO_CLMP; consequently, the trigger signal Str can turn on the discharge circuit 64 for conduction with a relatively high voltage (approaching the voltage of the node IO_CLMP) at the node TR, and a current path for ESD dissipation can be conducted between the node IO_CLMP and the power node GND.

Instead, when the voltage of the node IO_CLMP rises slowly (e.g., during power-on) or maintains a steady level (e.g., when operation voltage reaches a rated level, or during sustaining EOS), the RC circuit in the ESD detector 62 has enough time to charge the capacitor, so the voltage of the node TRi will approach that of the node IO_CLMP to maintain a low voltage (around the voltage of the power node GND) at the trigger node TR, and the discharge circuit 64 is not triggered. Similar to the discharge circuit 54 of FIG. 4, the discharge circuit 64 could forward conduct or reverse conduct even when it is not triggered, and a characteristic voltage leading to reverse conduction (form the node IO_CLMP to the power node GND) of the discharge circuit 64 represents the first characteristic of the ESD clamp 22. As discussed in FIG. 2, with proper design of the EOS control circuit 18 (FIG. 1) and 38A (FIG. 2/3) according to the first characteristic voltage and EOS requirements, conduction of exceeding current by the discharge circuit 64 during positive EOS can be prevented, and both ESD protection and EOS immunity are achieved.

Figure 6:
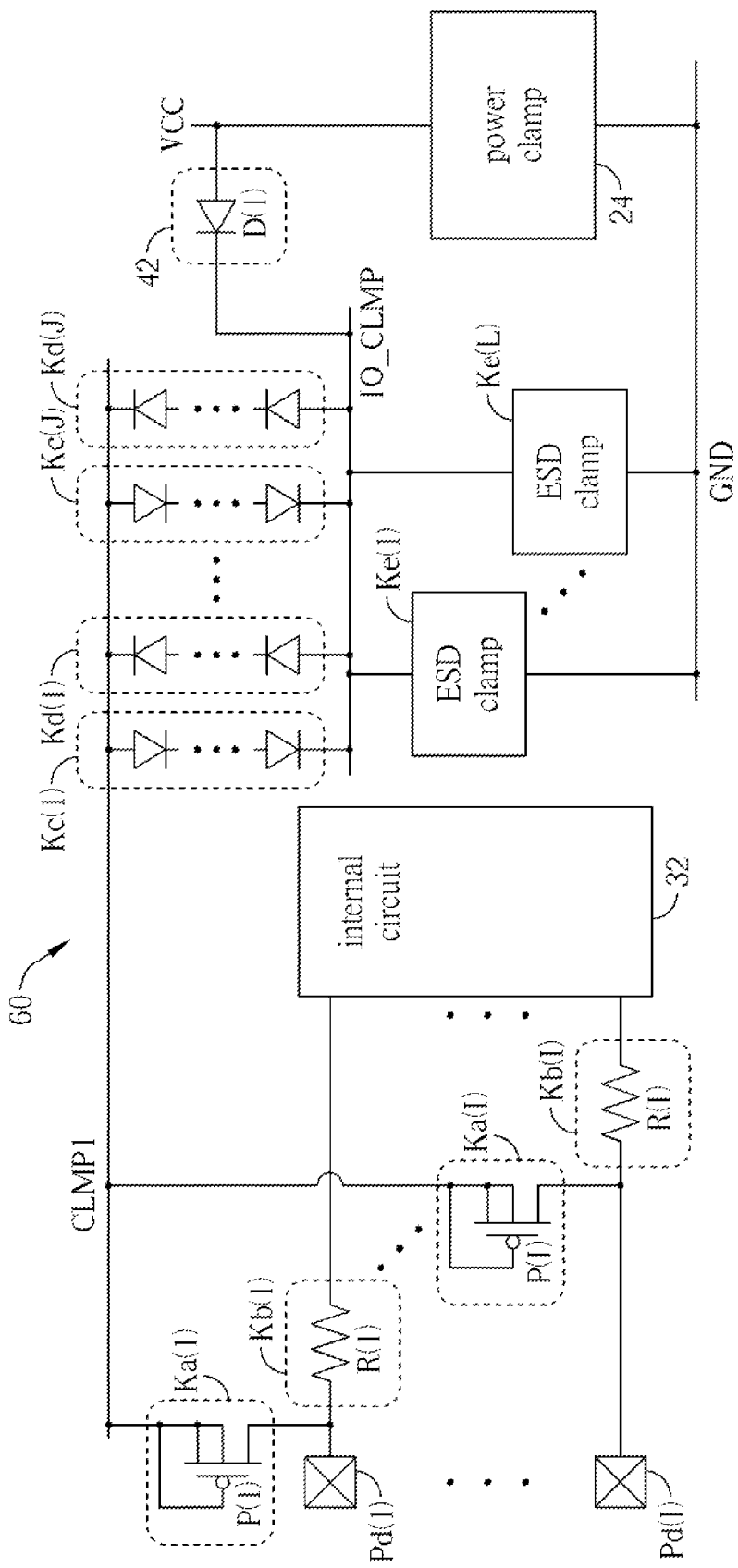
FIG. 6 and FIG. 7 respectively illustrate I/O interfaces of multiple pads according to embodiments of the invention.

Please refer to FIG. 6 which illustrate an ESD protection circuit 60 according to another embodiment of the invention; this embodiment demonstrates how the invention applies to an I/O interface with multiple pads. In this embodiment, the ESD protection circuit 60 is arranged to includes connection circuits Ka(1) to Ka(I) and current limiters Kb(1) to Kb(I) respectively for pads Pd(1) to Pd(I) with I an constant integer. The i-th pad (i=1, ..., I) Pd(i) is coupled to the internal circuit 32 through the corresponding current limiter Kb(i) (implemented by a resistor R(i)), so the internal circuit 32 exchanges data with external circuits (not shown) through these pads Pd(1) to Pd(I).

To implement ESD protection and EOS immunity, the i-th pad Pd(i) is further coupled to a common node CLMP1 through the corresponding connection circuit Ka(i), wherein the connection circuit Ka(i) can be implemented by a transistor P(i), or be implemented according to the connection circuits 16 and 46 of FIG. 1 and FIG. 3. Between the nodes CLMP1 and IO_CLMP, there are a quantity J of EOS control circuits Kc(1) to Kc(J) (with J a constant integer) and EOS control circuits Kd(1) to Kd(J). The j-th EOS control circuits Kc(j) and Kd(j) can respectively be implemented by one or more serially connected diodes. A quantity L (a constant integer) of ESD clamps Ke(1) to Ke(L) are coupled between the node IO_CLMP and the power node GND, each of the ESD clamps Ke(1) to Ke(L) can be implemented by embodiments shown in FIG. 4 and/or FIG. 5. The node IO_CLMP is further coupled to the power node VCC through a connection circuit 42 (implemented by, e.g., a diode D(1)), and a power clamp 24 is included to control voltage difference between the power nodes VCC and GND.

In the embodiment of FIG. 6, the quantity I of connection circuits Ka(1) to Ka(I) work with the same or different quantity J of EOS control circuits Kc(1) to Kc(J) and Kd(1) to Kd(J), as well as the same or different quantity L of ESD clamps Ke(1) to Ke(L). That is, I, J and K can be the same or different. Also, quantities of the EOS control circuits Kc(.) and Kd(.) can be different. According to FIG. 6 of the invention, a quantity I of pads Pd(.) among multiple pads of the I/O interface can be grouped to share a quantity J of EOS control circuits Kc(.)/Kd(.) and a quantity L of ESD clamps Ke(.) at the common nodes CLMP1 and IO_CLMP. While determining the practical quantities, factors such as ESD protection ability, EOS immunity ability and layout area can be considered. For example, greater quantities of EOS control circuits Kc(.) and ESD clamps Ke(.) enhance ESD protection by providing ESD dissipation current path of higher conductivity and lower impedance.

Figure 7:
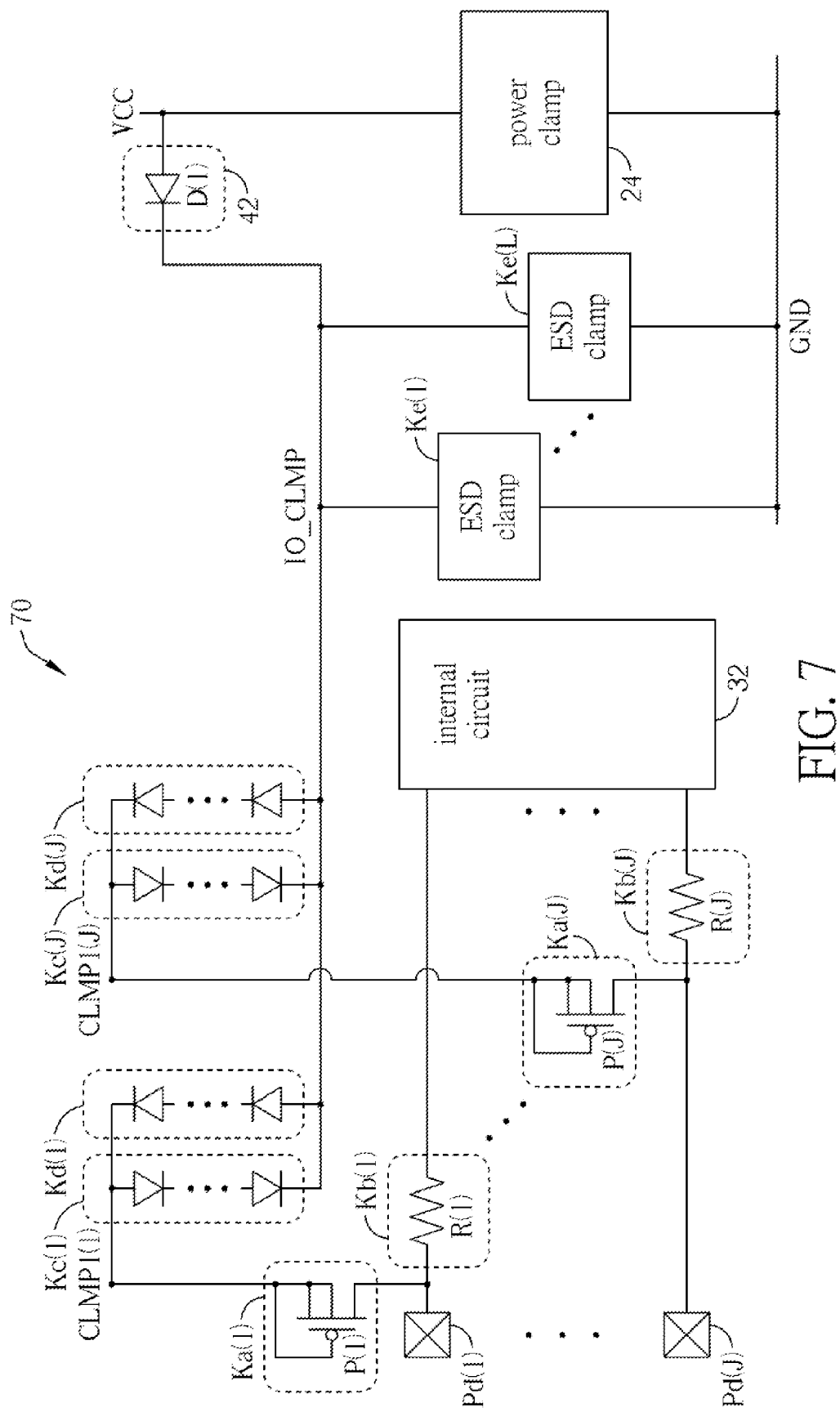

Please refer to FIG. 7. FIG. 7 illustrates an ESD protection circuit 70 according to another embodiment of the invention, which demonstrates the invention applies to another I/O interface of multiple pads. In FIG. 7, a quantity J of pads Pd(1) to Pd(J) are coupled to the internal circuit 32 respectively through the quantity J of current limiters Kb(1) to Kb(J) to implement an I/O interface of multiple pads. Different from FIG. 6, the j-th (j=1, J) connection circuit Ka(j) corresponding to the pad Pd(j) in FIG. 7 is coupled to corresponding EOS control circuits Kc(j) and Kd(j) through a corresponding node CLMP(j), and then is coupled to a quantity L of ESD clamps Ke(1) to Ke(L) through a common (commonly shared) node IO_CLMP. Because the nodes CLMP(1) to CLMP(J) are mutually isolated, every pad Pd(j) corresponds to a specific pair of EOS control circuits Kc(j) and Kd(j). However, these pads Pd(1) to Pd(J) can share the ESD clamps Ke(1) to Ke(L) through the common node IO_CLMP, where the quantities J and L can be different or the same.

Figure 8:
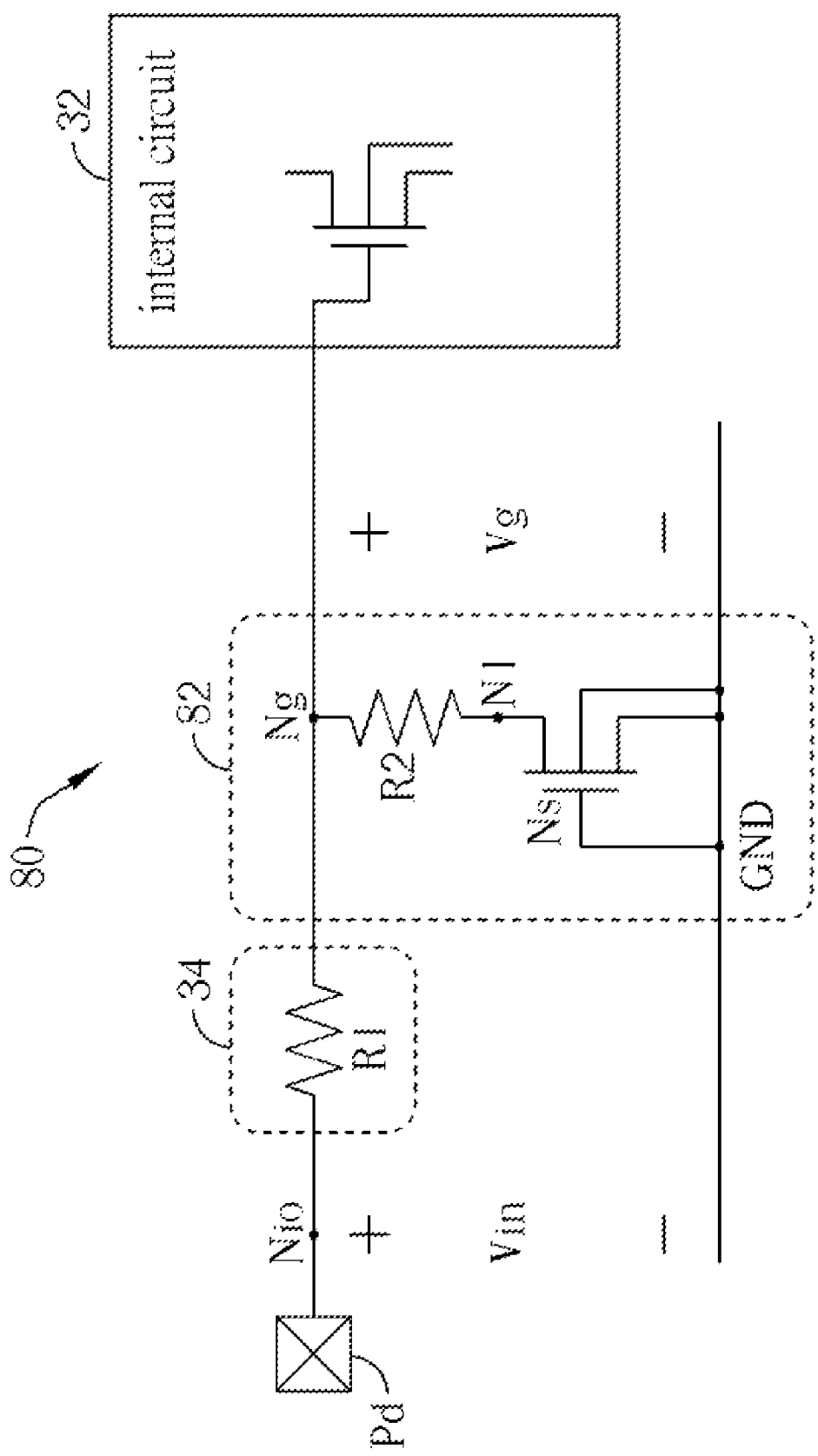
FIG. 8 illustrates enhanced EOS immunity according to one embodiment of the invention.

Please refer to FIG. 8 which illustrates an ESD protection circuit 80 according to another embodiment of the invention. Following the embodiments of FIG. 1 to FIG. 3, a voltage divider 82, in addition to the current limiter 34, can be included between each pad Pd and the internal circuit 32 for enhancement of EOS immunity. The current limiter 34 is implemented by a resistor R1 coupled between the node Nio (the pad Pd) and the internal circuit 32. The voltage divider 82 is coupled between the current limiter 34 and the internal circuit 32 at a node Ng; when the pad Pd receives EOS, the voltage divider 82 provides a third cross voltage Vg at the node Ng (i.e., cross the node Ng and the power node GND) to the internal circuit 32, wherein the cross voltage Vg is less than the voltage of EOS. That is, with operations of the current limiter 34 and the voltage divider 82, exceeding voltage of EOS will not be completely transmitted to the internal circuit 32, so circuitry in the internal circuit 32 (e.g., a gate receiving signals) is protected from damages of EOS.

As shown in the embodiment of FIG. 8, the voltage divider 82 is implemented by a resistor R2 and an n-channel MOS field effect transistor Ns. A gate, a source and a bulk of the transistor Ns are coupled to the power node GND to form a gate ground connection, a drain of the transistor Ns is coupled to the resistor R2 at a node N1. When EOS (e.g., positive EOS) occurs, the transistor Ns conducts by breakdown and maintains a cross voltage VH_Ns between the node N1 and the power node GND. With another cross voltage provided by the resistor R2 between the nodes N1 and Ng, the total cross voltage Vg provided by the voltage divider 82 between the node Ng and the power node GND can be evaluated as: Vg=(Vin−VH_Ns)*R2/(R1+R2)+VH_Ns=Vin*R2/(R1+R2)+VH_Ns*R1/(R1+R2). Here Vin is the voltage at the pad Pd; for example, the voltage Vin can equal the EOS voltage 0V+ during positive EOS. As the cross voltage Vg is less than an upper limit of voltage tolerance of the internal circuit 32, the voltage divider 82 protects the internal circuit 32 from damages of EOS. For example, assuming a gate of a MOS field effect transistor in the internal circuit 32 is utilized to receive signals from the pad Pd through the node Ng, the internal circuit 32 will be protected during (positive) EOS as the cross voltage Vg is less than a gate-oxide breakdown voltage of the gate.

Resistances of the resistors R1 and R2, as well as dimensions of the transistor Ns, can be designed according to EOS immunity requirements and layout area considerations. For example, increasing width of the resistor R1 and the dimensions of the transistor Ns reduces the cross voltage Vg; if layout area is concerned, dimensions of the resistor R2 and/or those of the transistor Ns can be properly reduced while the cross voltage Vg is kept smaller than the gate-oxide breakdown voltage of the internal circuit 32. Furthermore, the resistor R2 can be cancelled in the voltage divider 82, i.e., the drain of the transistor Ns at the node N1 is directly connected to the node Ng. The embodiment of FIG. 8 generally can be combined with the embodiments of FIG. 1 to FIG. 3, FIG. 6 and FIG. 7.

To sum up, comparing to conventional ESD protection circuits which suffer from EOS damages, the ESD protection circuit of the invention not only performs ESD protection, but also implements EOS immunity such that both the ESD protection mechanism and the internal circuit can be protected from EOS damages. As previously discussed, the circuit architecture of the invention reveals potentials to independently separate design considerations of ESD protection and EOS immunity, so both can be satisfies without compromise. The invention generally applies to I/O interfaces of various kinds of chips, dice and integrated circuits. For example, timing control (known as T-con) chips for display panels not only needs ESD protection, but also demands EOS immunity, and both can be well implemented by applying the invention.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An ESD protection circuit comprising:
a first connection circuit coupled between a pad and a first clamp node;
a first EOS control circuit coupled between the first clamp node and an I/O clamp node; and
an ESD clamp coupled between the I/O clamp node and a second power node; the ESD clamp working in a triggered conduction mode and a reverse conduction mode; wherein when the ESD clamp detects ESD, the ESD clamp works in the triggered conduction mode conducting the I/O clamp node to the second power node; when a voltage of the I/O clamp node is greater than a first characteristic voltage, the ESD clamp works in the reverse conduction mode conducting the I/O clamp node to the second power node;
wherein when the pad receives EOS, the first EOS control circuit provides a first cross voltage between the first clamp node and the I/O clamp node such that the voltage of the I/O clamp node is less than the first characteristic voltage to prevent the ESD clamp from conducting between the I/O clamp node and the second power node, and
wherein the ESD protection circuit is built within a single power domain between a first power node and the second power node, and the first clamp node is detached from the first power node.

2. The ESD protection circuit of claim 1 further comprising:
a second EOS control circuit coupled between the first clamp node and the I/O clamp node;
wherein the first connection circuit works in a forward conduction mode and a reverse conduction mode; when the first connection circuit works in the forward conduction mode, the first connection circuit conducts the pad to the first clamp node; when a voltage difference between the first clamp node and the pad is greater than a second characteristic voltage, the first connection circuit works in the reverse conduction mode conducting the first clamp node to the pad; and
wherein when the second power node receives EOS, the second EOS control circuit provides a second cross voltage between the I/O clamp node and the first clamp node such that the voltage difference between the first clamp node and the pad is less than the second characteristic voltage to keep the first connection circuit from conducting.

3. The ESD protection circuit of claim 1, wherein the first EOS control circuit comprises at least a p-n junction element for providing a p-n junction between the first clamp node and the I/O clamp node.

4. The ESD protection circuit of claim 3, wherein the p-n junction element is a diode.

5. The ESD protection circuit of claim 2, wherein the second EOS control circuit comprises at least a p-n junction element for providing a p-n junction between the I/O clamp node and the first clamp node.

6. The ESD protection circuit of claim 2, wherein the first connection circuit provides a p-n junction between the pad and the first clamp node, and the second characteristic voltage is a breakdown voltage of the p-n junction.

7. The ESD protection circuit of claim 1, wherein the first connection circuit provides a p-n junction between the pad and the first clamp node.

8. The ESD protection circuit of claim 1, wherein the first connection circuit comprises a p-channel metal-oxide-semiconductor field effect transistor with a gate and a source coupled to the first clamp node and a drain coupled to the pad.

9. The ESD protection circuit of claim 1, wherein the first connection circuit comprises a p-n-p bipolar junction transistor with an emitter and a base coupled to the first clamp node and a collector coupled to the pad.

10. The ESD protection circuit of claim 1 further comprising:
    a second connection circuit coupled between the pad and the second power node; when ESD occurs between the second power node and the pad, the second connection circuit conducts the second power node to the pad.

11. The ESD protection circuit of claim 1 further comprising:
    a third connection circuit coupled between a the first power node and the I/O clamp node, wherein the first clamp node is coupled to the I/O clamp node bypassing the first power node.

12. The ESD protection circuit of claim 11 further comprising:
    a power clamp coupled between the first power node and the second power node.

13. The ESD protection circuit of claim 1, wherein the ESD clamp comprises:
    an ESD detector coupled between the I/O clamp node and the second power node detecting ESD occurrence and providing a trigger signal in response to ESD detection; and
    a discharge circuit coupled between the ESD detector, the I/O clamp node and the second power node; wherein when ESD detection reflects ESD occurrence, the discharge circuit conducts the I/O clamp node to the second power node as the ESD clamp works in the triggered conduction mode.

14. The ESD protection circuit of claim 13, wherein when ESD detection does not reflect ESD occurrence, if a voltage difference between the I/O clamp node and the second power node is greater than the first characteristic voltage, the discharge circuit conducts the I/O clamp node to the second power node as the ESD clamp works in the reverse conduction mode.

15. The ESD protection circuit of claim 13 wherein the first characteristic voltage is a breakdown voltage of the discharge circuit.

16. The ESD protection circuit of claim 1 further comprising:
    a current limiter coupled between the pad and an internal circuit; and
    a voltage divider coupled between the current limiter and the internal circuit; wherein when the pad receives EOS, the voltage divider provides a third cross voltage, which is less than a voltage of EOS, to the internal circuit.

17. The ESD protection circuit of claim 16 wherein the voltage divider comprises:
    a resistor, and
    an n-channel metal-oxide-semiconductor field effect transistor with a gate and a source coupled to the second power node and a drain coupled to the resistor.

* * * * *